US012607364B1

(12) United States Patent
Brown

(10) Patent No.: US 12,607,364 B1
(45) Date of Patent: Apr. 21, 2026

(54) PORTABLE COOKING SHIELD

(71) Applicant: Larry Bracy Brown, Davenport, FL (US)

(72) Inventor: Larry Bracy Brown, Davenport, FL (US)

( * ) Notice: Subject to any disclaimer, the term of this patent is extended or adjusted under 35 U.S.C. 154(b) by 6 days.

(21) Appl. No.: 19/078,106

(22) Filed: Mar. 12, 2025

(51) Int. Cl.
| | |
|---|---|
| *F24C 5/20* | (2021.01) |
| *A47J 36/36* | (2006.01) |
| *A47J 37/07* | (2006.01) |
| *F24C 15/12* | (2006.01) |
| *F24C 15/28* | (2006.01) |

(52) U.S. Cl.
CPC ............... *F24C 15/28* (2013.01); *A47J 36/36* (2013.01); *A47J 37/0786* (2013.01); *F24C 15/12* (2013.01)

(58) Field of Classification Search
CPC ........ F24C 15/28; F24C 15/12; A47J 37/0786
USPC .......................................................... 126/38
See application file for complete search history.

(56) References Cited

U.S. PATENT DOCUMENTS

| | | | | |
|---|---|---|---|---|
| 3,120,076 | A | * | 2/1964 | Zuch ...................... A47B 71/00 |
| | | | | 312/258 |
| 3,384,066 | A | * | 5/1968 | Tufts ..................... A47J 37/079 |
| | | | | 126/9 R |
| 3,428,039 | A | * | 2/1969 | Becker ...................... F24C 1/16 |
| | | | | 126/38 |
| 4,149,514 | A | * | 4/1979 | Latouf ................ A47J 37/0704 |
| | | | | 126/25 R |
| 4,714,013 | A | * | 12/1987 | Telfer ...................... F24B 1/205 |
| | | | | 99/449 |
| 5,785,046 | A | * | 7/1998 | Colla ...................... F24B 1/202 |
| | | | | 126/25 R |
| 2008/0276926 | A1 | * | 11/2008 | Chang ................... F24B 15/005 |
| | | | | 126/25 R |
| 2017/0234545 | A1 | * | 8/2017 | Barford ................... F24B 1/205 |
| | | | | 126/29 |
| 2021/0372625 | A1 | * | 12/2021 | Fitzgibbins ............. F24B 1/182 |

* cited by examiner

*Primary Examiner* — Avinash A Savani
(74) *Attorney, Agent, or Firm* — Fraline J. Allgaier

(57) ABSTRACT
An improved portable cooking shield for enclosing a cooking device is presented. The portable cooking shield features a plurality of heat-absorbing side panels in an extended spaced-apart relationship and being pivotally coupled by collapsible support hinges. Heat resistant handles are provided for lifting the shield and for compressing the plurality of side panels into a flattened position. An upwardly extending lighting device port is provided for accommodating at least one lighting device for the cooking device.

4 Claims, 8 Drawing Sheets

PORTABLE COOKING SHIELD

FIELD OF THE INVENTION

The present invention relates to a portable cooking shield for enclosing a cooking device, which in its preferred embodiment, is a cooking shield having a plurality of heat-absorbing panels in an extended spaced-apart relationship wherein closure of a closing mechanism creates a formed enclosure for the cooking device to reduce wind interference during outdoor cooking.

BACKGROUND OF THE INVENTION

The present invention addresses a common challenge faced by outdoor cooking enthusiasts: the interference of wind during cooking, which can significantly affect cooking efficiency and food quality. Outdoor cooking, whether for leisure or professional purposes, often requires a stable and controlled environment to ensure optimal results. Wind can disrupt flame stability, alter cooking temperatures, and increase cooking time, thereby leading to frustration and suboptimal meal preparation.

Traditional solutions to mitigate wind interference include using makeshift barriers or positioning cooking devices in sheltered locations. However, these methods often lack portability, structural integrity, and ease of use, rendering them impractical for many outdoor settings. Additionally, existing shields for cooking devices are frequently cumbersome, lack adequate heat resistance, and do not provide the necessary adjustability or stability required for varied outdoor conditions.

The invention presented herein introduces a portable cooking shield designed specifically to enclose a cooking device and effectively reduce wind interference. This innovative cooking shield features a plurality of heat absorbing side panels that are strategically arranged to form a protective enclosure around the cooking device. Each panel is designed with a heat-resistant structure, ensuring safety and functionality during cooking.

The cooking shield is comprised of multiple sections that can be pivotally coupled, allowing for easy setup and breakdown. This design not only enhances portability but also facilitates a customizable configuration to accommodate different cooking devices. The inclusion of elongated heat-resistant handles allows users to effortlessly adjust the shield's position, ensuring optimal protection against wind while maintaining accessibility to the cooking device.

By addressing the limitations of prior art, this invention provides an effective, portable solution for outdoor cooking enthusiasts, enhancing their cooking experience and ensuring consistent results, regardless of environmental challenges.

SUMMARY

This disclosure presents a portable cooking shield specifically designed to enclose a cooking device to reduce wind interference during outdoor cooking. The portable cooking shield comprises elongated rails functioning as heat resistant handles being mounted to a plurality of side panels for lifting and transporting the cooking shield after use and for opening and closing shield the portable cooking shield by moving the elongated rails toward each other.

In addition, a lighting device port extends upwardly through at least one panel for accommodating at least one lighting device for the cooking device and the lighting device being insertable through a lighting device port.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE DRAWINGS

The present embodiments are illustrated by way of the figures of the accompanying drawings, which may not necessarily be to scale, in which like references indicate similar elements, and in which.

DETAILED DESCRIPTION

Figure 1:
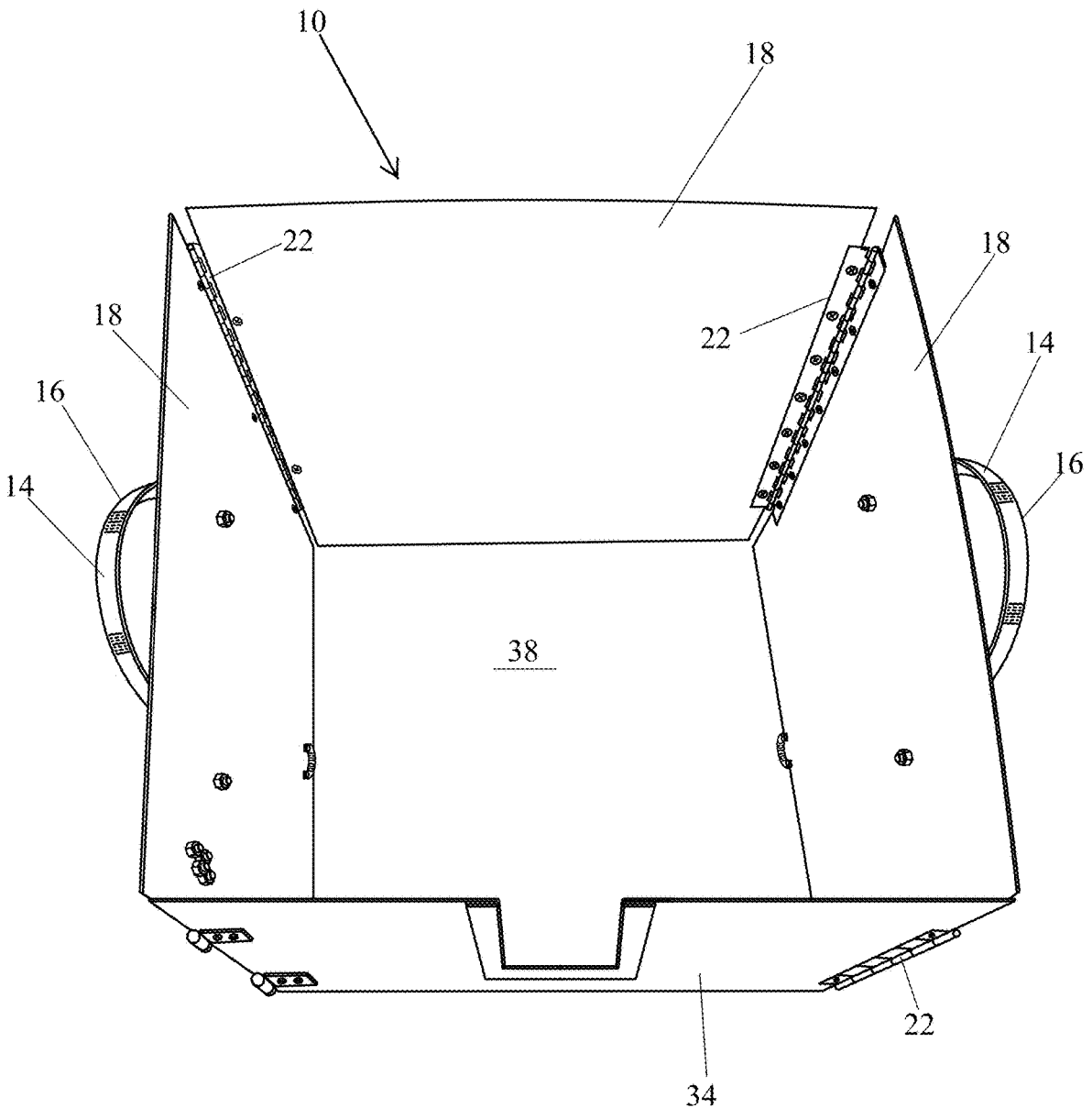
FIG. 1 shows a portable cooking shield with the plurality of side panels in a formed enclosure in accordance with an embodiment of the present invention.

The following detailed description is a contemplated mode of carrying out a portable cooking shield 10 and method of manufacture as described herein. Although the portable cooking shield 10 and method of manufacture are explained in relation to an illustrated embodiment, it is understood that many possible modifications and variations can be made without departing from the spirit and scope of the disclosure.

The inventor anticipates using aluminum as a lightweight and heat-absorbing material to construct the side panels 18 of the cooking shield 10. A lightweight frame can be easily connected to a ground steak so that the cooking shield 10 remains upright. In a preferred embodiment, the shield 10 can be made of aluminum sheet measuring approximately 17.5" in width and 18" in height and constructed to fit around a cooking frame that measures 13" W×17"¼" H. However, various materials can also be considered for their heat-absorbing properties. Potential heat-absorbing materials include stainless steel and copper, which are known for strength, thermal conductivity and durability and can efficiently absorb and retain heat. Cast iron is known for its heat retention capabilities, providing consistent cooking temperatures. The side panels 18 can also be manufactured in various shapes and sizes, depending on the manufacturer's specifications and intended use of the cooking shield 10.

In a preferred embodiment, the panels 18 are illustrated in a semi-rectangular shape. However, the shape and dimensions of the panels 18 can be modified to meet specific aesthetic or functional requirements. For instance, the panels 18 can be designed in a curved or angular form to enhance aerodynamics or integrate seamlessly with various cooking devices 12. This adaptability allows manufacturers to tailor the cooking shield 10 to diverse outdoor cooking scenarios, ensuring that it can effectively protect against wind while accommodating different cooking setups.

The cooking shield 10 is designed to accommodate a variety of cooking devices 12, enhancing its versatility in outdoor cooking environments. Examples of compatible devices 12 include portable stoves that cater to various sizes and heat requirements. Additionally, the shield 10 can enclose grills that are suitable for both gas and charcoal options and provide wind protection during grilling sessions. It can also accommodate fire pits, wood-burning units, smokers, or the same for ensuring consistent heat retention while smoking foods. Furthermore, the shield 10 is adaptable for outdoor ovens, such as pizza ovens or other appliances that require stable heat. This versatility makes the cooking shield 10 an essential accessory for a wide range of outdoor cooking applications including deep-frying, barbecues, or the same allowing for the preparation of various kinds of food.

The shield 10 can be configured to maintain a minimum clearance of 2 inches around the cooking frame during operation, thereby providing safety from direct contact and reducing fire hazards. Clearance of 2 inches around the cooking stove during operation further provides safety from direct contact and reducing fire hazards.

While the primary function of the cooking shield 10 is to reduce wind interference, it also serves additional purposes that enhance the outdoor cooking experience. The shield 10 can improve heat retention, allowing for more efficient cooking and energy savings, which are particularly beneficial in windy conditions. By enclosing the cooking area, the shield 10 contributes to user safety by minimizing the risk of accidental contact with flames or hot surfaces, making it a practical and essential tool for outdoor cooking.

The inventor claims the use of collapsible support hinges 22 to couple the plurality of side panels 18. However, alternative mechanisms can be utilized to achieve the same functionality, adding versatility to the design. Examples of other coupling devices include detachable clips that allow panels 18 to connect and disconnect easily while providing stability during use. Sliding tracks can enable panels 18 to slide into place and fold away for storage, enhancing user convenience. Magnetic fasteners offer a quick and user-friendly way to secure panels 18 together while allowing for easy disassembly. These alternative mechanisms can enhance user convenience and adaptability in various outdoor settings.

A closing mechanism, shown in the drawings features a hook-closing element between the first and fourth panel sections. However, the inventor anticipates various closing mechanisms that facilitate easy operation and enhance usability. Latches provide a more robust and secure closure while allowing for quick access to the cooking device 12. Buckle systems enable a secure fit with the option for quick release, making it convenient for users. Lastly, magnetic closures offer a seamless, user-friendly option for closing the shield 10. Each of these alternatives has its benefits, including ease of use, security, and adaptability to different panel configurations.

The heat-resistant handles 16 on the cooking shield 10 can be fabricated in various sizes, shapes, and projections from the panels 18. Additionally, the shield 10 may feature multiple handles 16 based on the manufacturer's design preferences. Possible heatproof materials for the handles include silicone, resin, fiberglass, nylon, or the same to provide the flexibility, heat-resistance, strength, and comfort while providing a sturdy grip for users. This variety of materials allows manufacturers to customize the handles 16 according to user needs and preferences.

For construction and also in a preferred embodiment, the front of the shield 10 has a lighting device port 32 designed to fit at least one lighting device 36. The lighting device port 32 for the cooking shield 10 can be relocated to different panels based on user preference or design requirements. Furthermore, the dimensions of the lighting device port 32 can be adjusted to be smaller or larger, accommodating various devices that may be useful during use. Potential applications for the lighting device port 32 may include lighting devices 36 such as electric igniters that assist in starting fires or stoves. For convenience, the lighting device port 32 can also accommodate temperature probes for monitoring cooking temperatures without removing the shield 10. Additionally, ventilation systems can be integrated into the lighting device port 32, allowing for air circulation while maintaining heat retention. Various types of lighting devices 36, such as LED lights or instant-activation lights, can also be utilized for improved visibility and safety during outdoor cooking.

It can be appreciated that the shape of the anchors used to secure the cooking shield 10 can vary depending on the manufacturer's design choices. Possible anchor shapes include rectangular anchors, which provide stability, a broad surface area for stability, enhance grip and prevent rotation. Custom-shaped anchors can be tailored to specific ground conditions or user preferences. Additionally, the anchors can be positioned in different locations as shown in the drawings, allowing for flexibility in design. Various types of ground spikes can be employed to enhance stability, including hook stakes designed to grip the ground securely, spiral stakes that twist into the ground for added holding power, flat spikes that provide a wide base for stability on softer surfaces, and telescoping spikes that allow for adjustable depth based on ground conditions. These options ensure that the cooking shield 10 remains stable and secure during use, regardless of the outdoor environment.

The cooking shield 10 can be offered in both electronic and manual versions to cater to various user preferences and needs. In the electronic version, a simple push of a button activates an automatic ignition system that lights the cooking device 12, such as a pot or grill, using a fuel source like propane gas. This convenience enhances the user experience by eliminating the need for manual ignition methods, allowing for a quick and efficient setup. The electronic version may also integrate safety features, such as automatic shut-off mechanisms, to provide added peace of mind while cooking outdoors.

To further enhance the stability of the cooking shield 10, a Velcro strap can be incorporated, providing an adjustable and secure fastening method. This strap can be designed as a fireproof device, ensuring durability and safety during use in high-temperature environments. In addition to Velcro straps, other types of fastening solutions could be beneficial, including elastic bungee cords that offer flexibility and tension, securing the shield 10 in place against strong winds. Additionally, adjustable nylon or polyester straps with buckles can provide robust support, allowing users to customize the fit and tension as needed. These various strap options contribute to the overall stability and performance of the cooking shield 10, ensuring it remains securely in place throughout the cooking process.

Manufacturers can enhance the user experience by including a transport bag with the cooking shield 10, effectively selling it as a comprehensive kit. This transport bag is designed to accommodate the entire cooking shield 10, providing a convenient solution for storage and transportation. By having a dedicated bag, users can easily carry the shield 10 to various outdoor locations, whether for camping, picnicking, or tailgating. The inclusion of a transport bag also protects the shield 10 from environmental wear and tear, prolonging its lifespan and maintaining its functionality.

Offering the cooking shield 10 as part of a kit provides several benefits. First, it simplifies the purchasing process for consumers, as they receive all the necessary components in one package. Additionally, having a transport bag encourages users to take the shield 10 on outdoor adventures, promoting safe and efficient cooking in various settings. The kit format also allows manufacturers to highlight any complementary accessories, such as fuel canisters or cooking utensils, further enhancing the overall cooking experience. This bundled approach not only adds value for the consumer but also fosters brand loyalty by providing a complete outdoor cooking solution.

Figure 2:
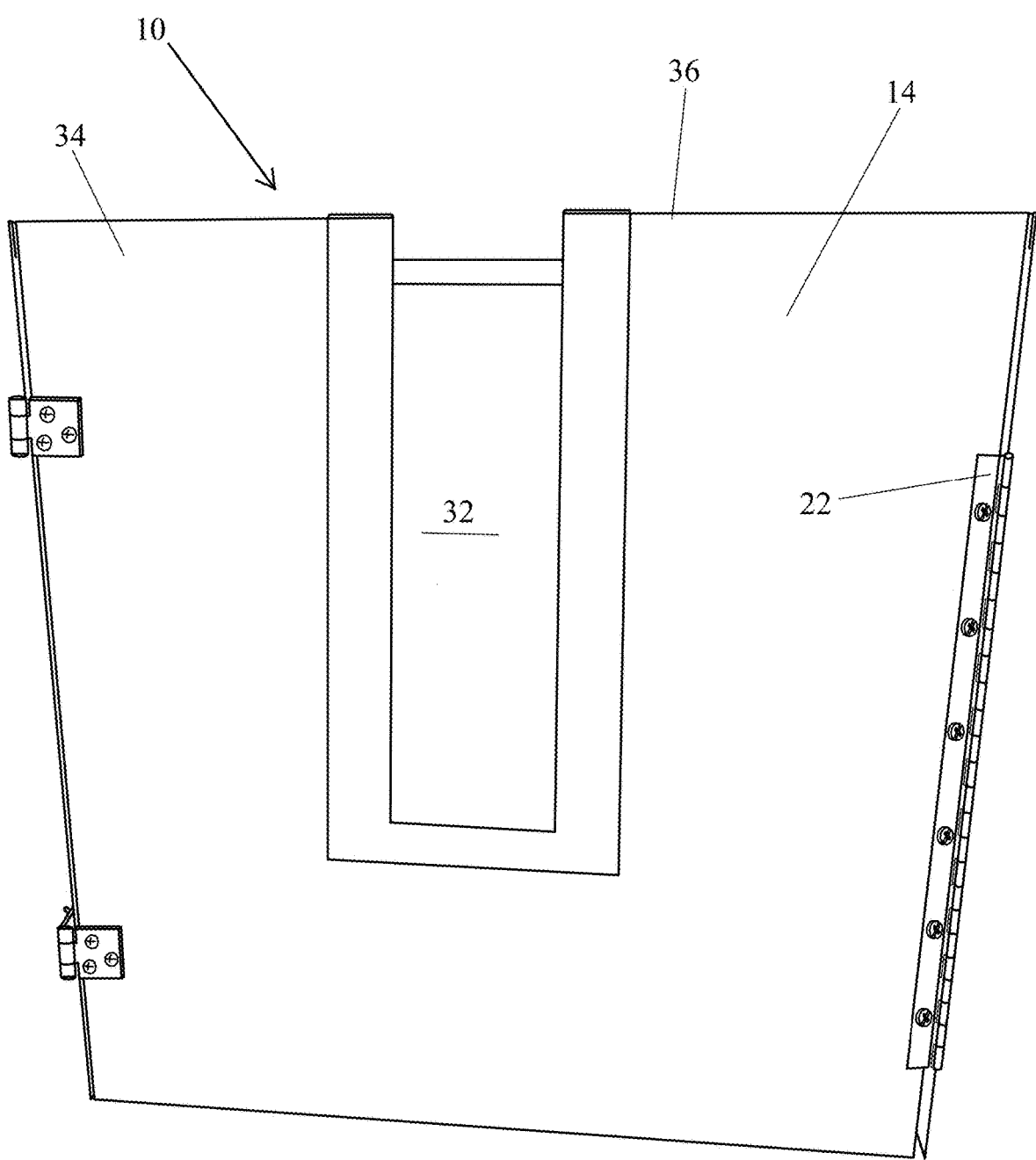
FIG. 2 shows a side view of the portable cooking shield thereof having a lighting device port extending upwardly through at least one panel for accommodating at least one lighting device.
Figure 3:
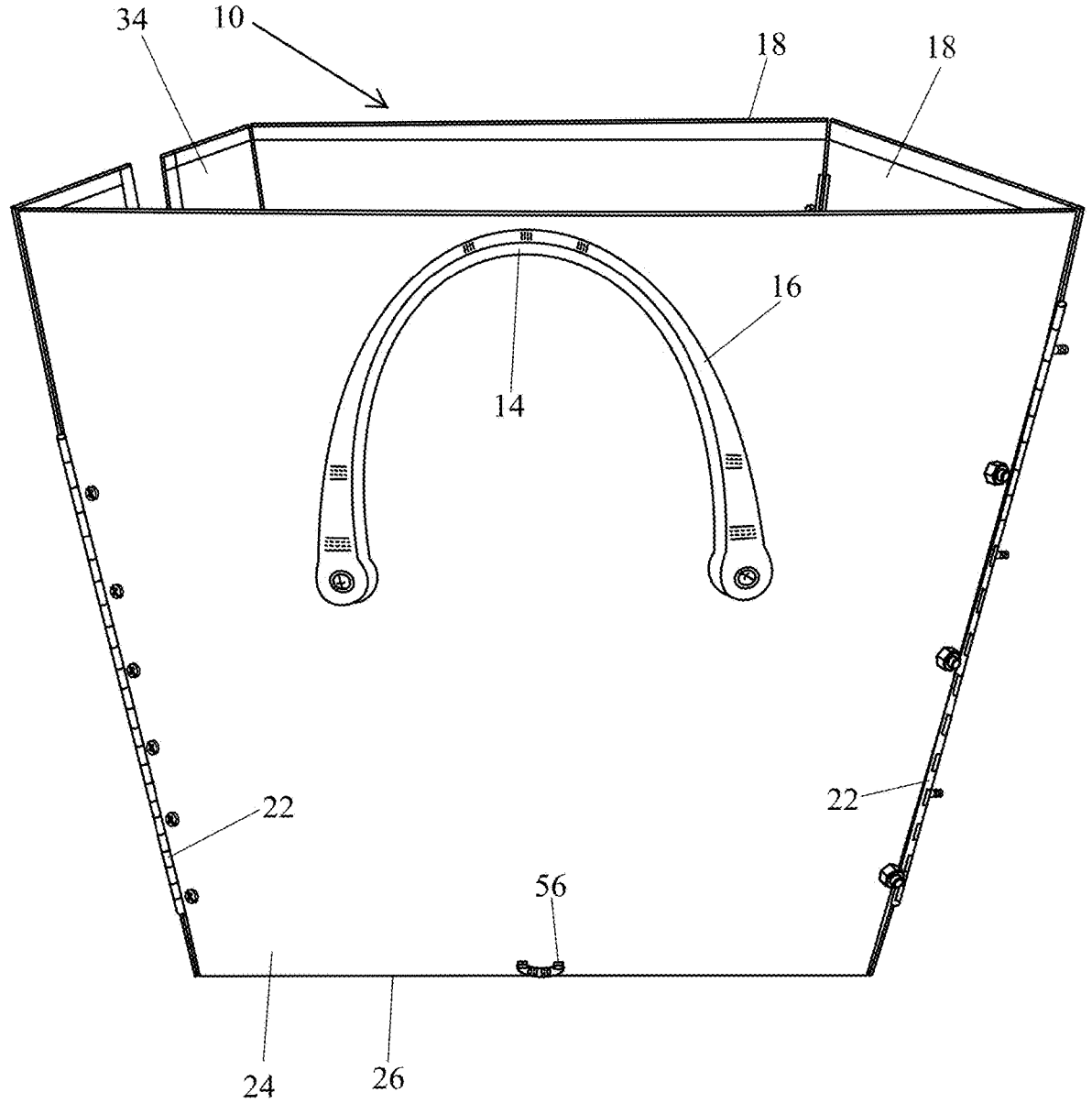
FIG. 3 illustrates a side view of an outwardly projecting elongated rail mounted to the portable cooking shield in accordance with an embodiment of the present invention.
Figure 4:
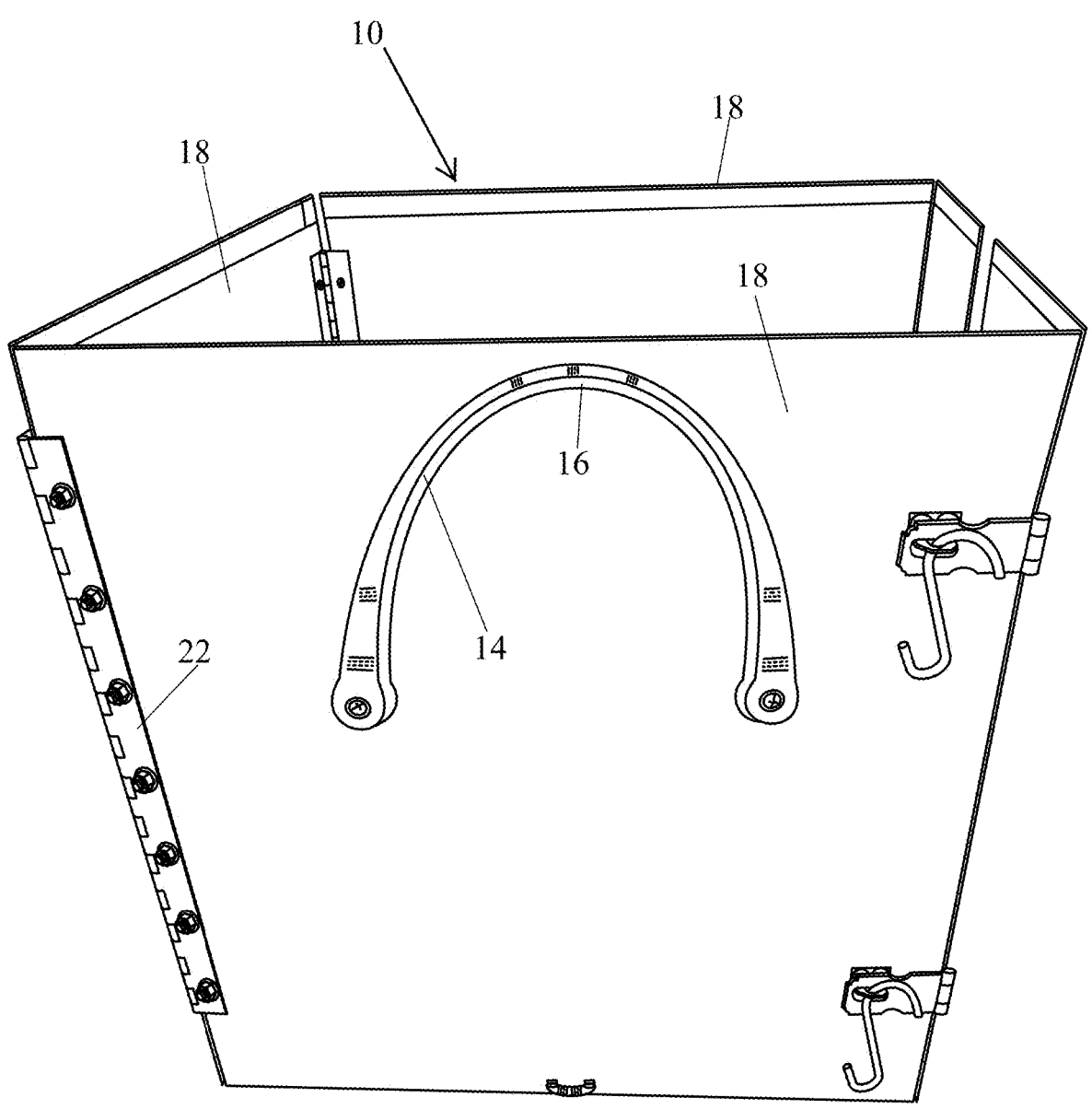
FIG. 4 illustrates an exemplary closure mechanism and an outwardly projecting elongated rail mounted to a panel in accordance with an embodiment of the present invention.
Figure 5:
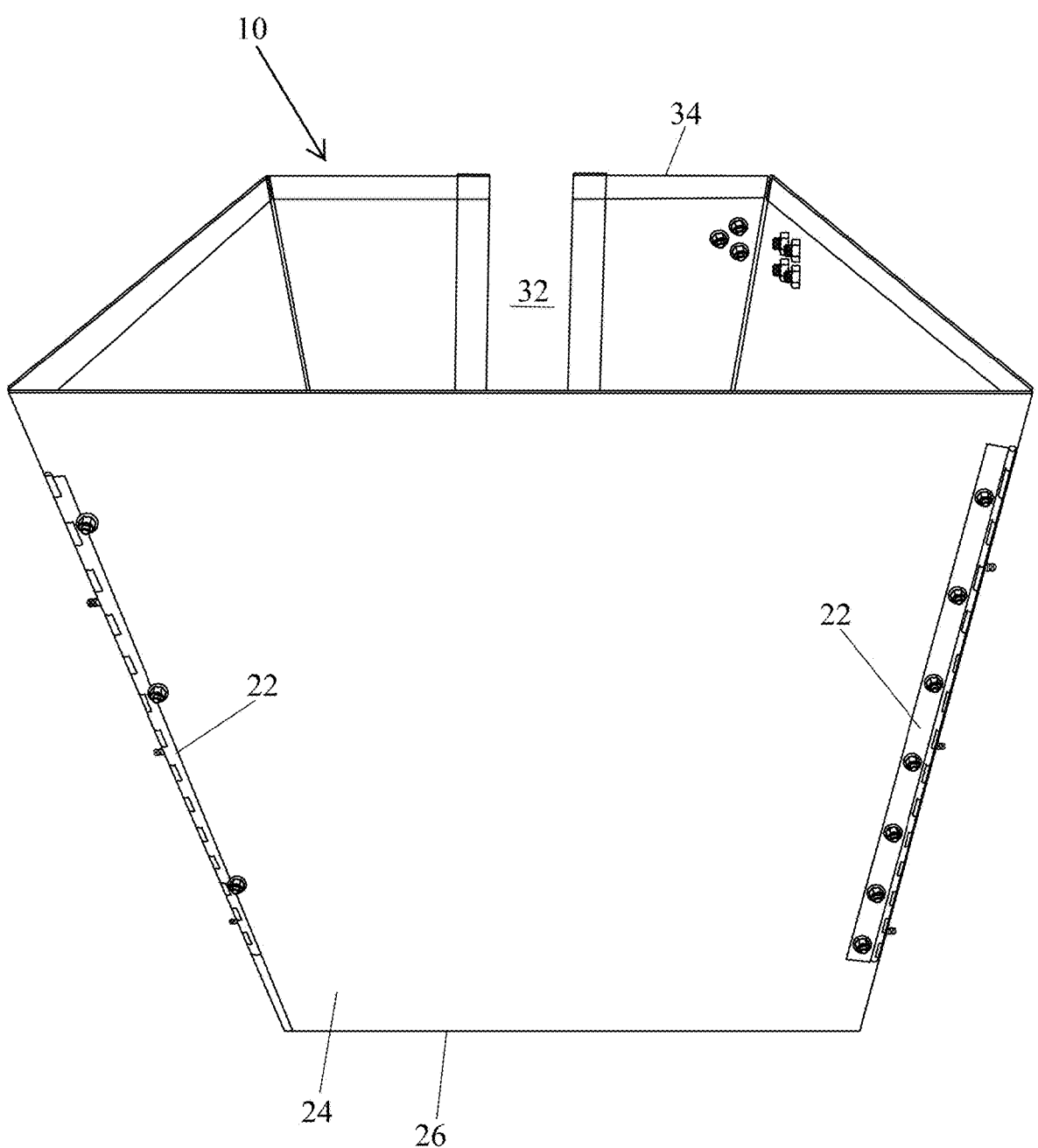
FIG. 5 illustrates a back view thereof with the plurality of side panels in a formed enclosure in accordance with an embodiment of the present invention.
Figure 6:
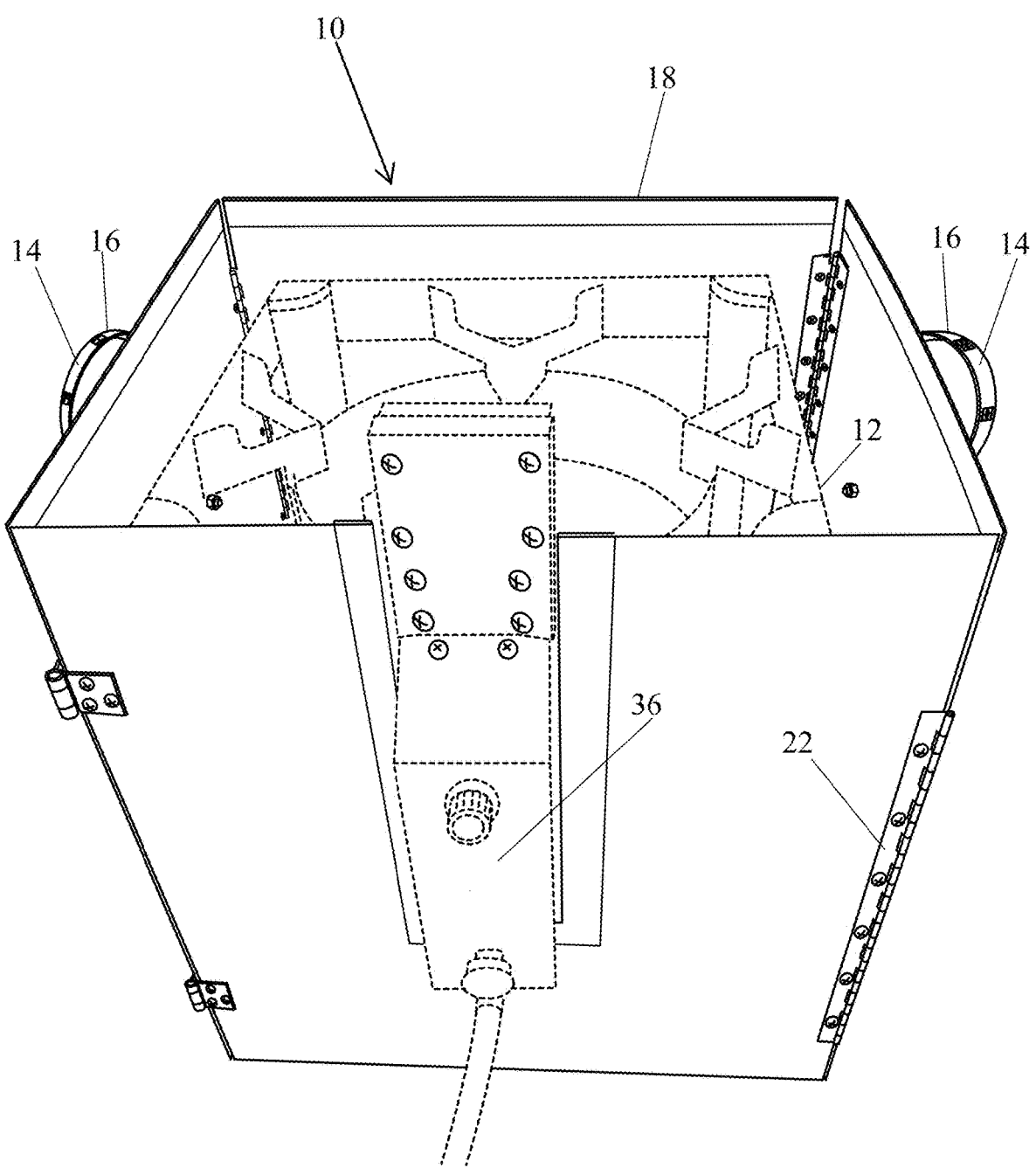
FIG. 6 illustrates a side view thereof showing a lighting device port and a lighting device being inserted therein for use with a cooking device in accordance with an embodiment of the present invention.
Figure 7:
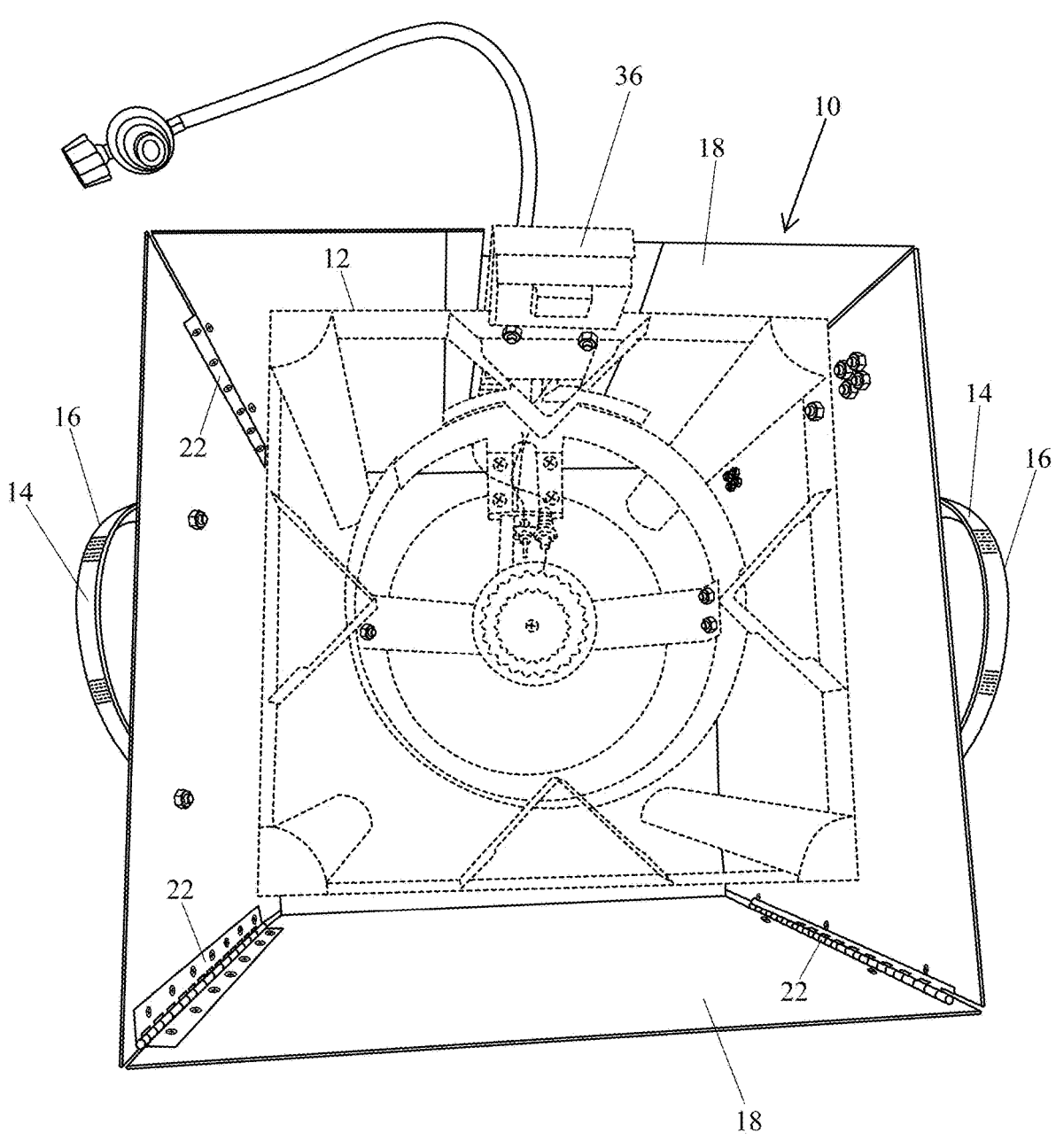
FIG. 7 illustrates a top view thereof showing the plurality of side panels enclosing a cooking device in accordance with an embodiment of the present invention.
Figure 8:
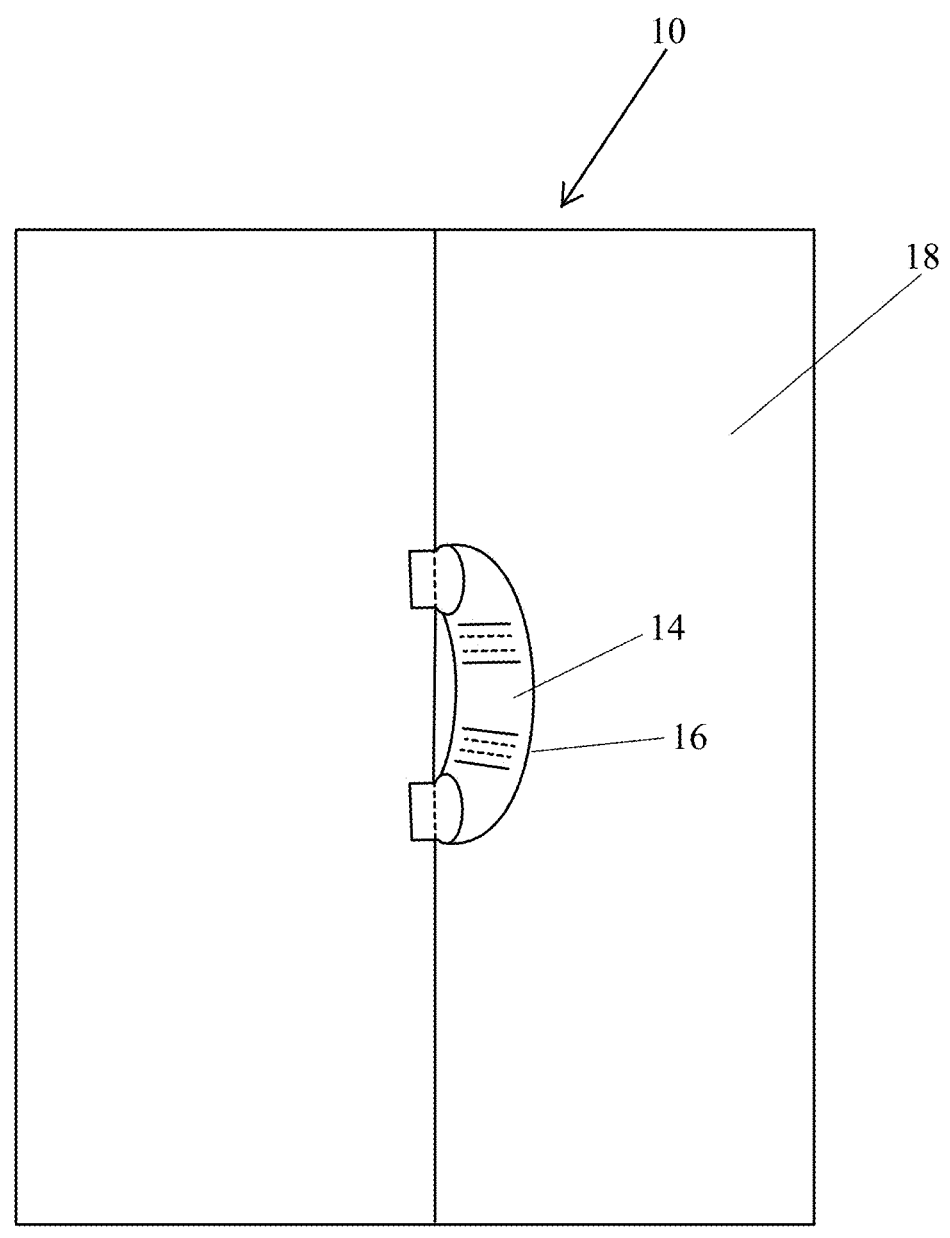
FIG. 8 illustrates a folded configuration of the cooking shield in accordance with an embodiment of the present invention.

For example, and without limitation, FIGS. 1-7 show the portable cooking shield 10 according to one embodiment of the present disclosure for enclosing a cooking device 12 and to reduce wind interference during outdoor cooking. The cooking shield 10 comprises elongated rails 14 mounted to a plurality of side panels 18, and the elongated rails 14 define heat resistant handles 16 for lifting and transporting the cooking shield 10 after use. The cooking shield 10 is opened and closed by compressing the plurality of side panels 18 and moving the elongated rails 14 toward each other, thereby further compressing collapsible support hinges 22 which define vertical pivot axes 30 points for coupling the plurality of side panels 18. The heat resistant handles 16 project upwardly from the plurality of side panels 18 and are disposed at an acute angle therefrom to facilitate movement and transport of the cooking shield after use.

A lighting device port 32 extends upwardly through at least one panel 34 thereof for accommodating at least one lighting device 36 for the cooking device 12 and the lighting device 36 being insertable through the lighting device port 32 when the plurality of panels 18 are in use and being removable from the lighting device port 32 when the portable cooking shield 10 is flattened.

The plurality of side panels 18 are adapted to enclose a cooking device in a freestanding configuration on a flat supporting surface 38 and the cooking shield 10 comprises a frame sized to enclose the cooking device. The cooking shield 10 is thereby foldable after use by compressing the heat resistant handles 16 toward each other.

The plurality of side panels 18 is disposed in a symmetrical manner about the cooking device, thereby creating a balanced protective enclosure. Each panel 18 is evenly spaced apart, ensuring that the cooking device is centrally located within the shield 10. This symmetrical arrangement not only enhances the aesthetic appeal of the cooking shield 10 but also optimizes wind protection by allowing for uniform airflow and support from all sides. The spaced-apart relationship among the panels 18 provides adequate room for heat dissipation while maintaining stability, thereby effectively shielding the cooking device from wind and other environmental factors. The heat combustion is directed towards the food being cooked when the shield 10 is in an enclosed position and permits the user to cook or turn over food items without removing the shield 10. This thereby increases the effectiveness of the device and conserves the heat. The side panels 18 are further adapted to enclose a cooking device to block hot liquid splashing outwardly therefrom, while allowing passage of vapor.

The cooking shield 10 comprises side panels 18 that are manufactured in sizes specifically tailored to enclose the cooking device securely. Manufacturers have the flexibility to decide on the dimensions of the side panels 18 based on the characteristics of the accompanying cooking devices, whether sold together or separately. For instance, if a compact portable stove is paired with the shield 10, the panels 18 might be designed to be shorter and narrower to match the stove's dimensions. Conversely, if the shield 10 is intended for larger grills or outdoor ovens, the panels 18 could be manufactured to be taller and wider. This adaptability ensures that the cooking shield 10 effectively protects a range of cooking devices, providing optimal functionality across various applications.

The cooking shield 10 is designed to be foldable after use, allowing for easy storage and transport. Once cooking is complete, the formed enclosure can be compressed by bringing each panel 18 towards one another at the collapsible support hinges 22. This folding mechanism allows the entire device to be flattened into a compact form, making it convenient to stow away or carry. The collapsible support hinges 22 facilitate smooth movement, ensuring that the panels 18 fold seamlessly without obstructing one another. This thoughtful design not only enhances the portability of the cooking shield 10 but also ensures that it can be easily set up and taken down, making it an ideal solution for outdoor cooking enthusiasts.

Having described my invention, however, many modifications thereto will become apparent to those skilled in the art to which it pertains without deviation from the spirit of the invention as defined by the scope of the appended claims. Although the invention has been explained in relation to its preferred embodiment, it is to be understood that many other possible modifications and variations can be made without departing from the spirit and scope of the invention.

What is claimed is:

1. A portable cooking shield for enclosing a cooking device and to reduce wind interference during outdoor cooking, the cooking shield comprising:

elongated rails mounted to a plurality of side panels, and the elongated rails being heat resistant handles for lifting and transporting the cooking shield after use and wherein the cooking shield is opened and closed by compressing the plurality of side panels by moving the elongated rails toward each other thereby further compressing collapsible support hinges which are vertical pivot axes for coupling the plurality of side panels and wherein the heat resistant handles project upwardly from the plurality of side panels and being disposed at an acute angle therefrom to facilitate movement and transport of the cooking shield after use;

a lighting device port extends upwardly through at least one panel thereof for accommodating at least one lighting device for the cooking device and the lighting device being insertable through the lighting device port when the plurality of panels are in use and being removable from the lighting device port when the portable cooking shield is flattened; and the plurality of side panels being adapted to enclose a cooking device in a freestanding configuration on a flat supporting surface.

2. The cooking shield according to claim 1 wherein the cooking shield comprises a frame sized to enclose the cooking device.

3. The cooking shield according to claim 1 wherein the cooking shield is foldable after use by compressing the heat resistant handles toward each other.

4. A method of construction of a portable cooking shield for enclosing a cooking device and to reduce wind interference during outdoor cooking, the method comprising the steps of:

providing elongated rails mounted to a plurality of side panels and the elongated rails defining heat resistant handles for lifting and transporting the cooking shield and wherein the cooking shield is opened and closed by compressing the plurality of side panels and moving the elongated rails toward each other and wherein the heat resistant handles project upwardly from plurality of side panels and being disposed at an acute angle therefrom; and a lighting device port extends upwardly through at least one panel thereof for accommodating at least one lighting device for the cooking device and the lighting device being insertable through the lighting device port when the plurality of panels are in use and being removable from the lighting device port when the portable cooking device is flattened.

\* \* \* \* \*